United States Patent [19]

Stanley

[11] Patent Number: 4,924,705
[45] Date of Patent: May 15, 1990

[54] PENDENT-TYPE WHEEL BALANCER

[76] Inventor: Leon R. Stanley, 40 Skyline Cir., Reno, Nev. 89509

[21] Appl. No.: 309,167

[22] Filed: Feb. 13, 1989

[51] Int. Cl.⁵ .............................................. G01M 1/12
[52] U.S. Cl. ........................................ 73/484; 73/486
[58] Field of Search .................. 73/483, 484, 485, 486

[56] References Cited

U.S. PATENT DOCUMENTS

| | | | |
|---|---|---|---|
| 3,036,468 | 5/1962 | Anderson | 73/486 |
| 3,045,497 | 7/1962 | Lackie | 73/486 |
| 3,148,546 | 9/1964 | Karig | 73/486 |
| 3,452,605 | 7/1969 | Markley | 73/486 |
| 3,992,950 | 11/1976 | Pflieger | 73/486 |
| 4,011,762 | 3/1977 | Kubik | 73/484 |
| 4,043,218 | 8/1977 | Groeper | 73/487 |
| 4,051,733 | 10/1977 | Tomkin | 73/484 |
| 4,194,399 | 3/1980 | Wilson | 73/486 |
| 4,237,735 | 12/1980 | Rodgers | 73/486 |
| 4,448,073 | 5/1984 | Patry | 73/484 |

Primary Examiner—John Chapman

[57] ABSTRACT

A suspension-type static wheel balancer for do-it-yourself mechanics including an upwardly-sloping conically-shaped body both centering and supporting the wheel through its center hub aperture in a generally horizontal position under the lifting point. The entire wheel and balancer assembly is supported by a flexible cable attached through a disk centrally attached inside the cone body and passing upwardly through the aperture in the upper end of the cone body for attachment to a suitable lifting means. After manual centering any imbalance condition is indicated when the wheel is lifted by a lack of centrality of the cable relative to the upper opening of the cone body. A ramification incorporates a means of adjusting the sensitivity of the balancer by vertically adjusting the universal pivot point relative to the center of gravity of the wheel.

1 Claim, 1 Drawing Sheet

PENDENT-TYPE WHEEL BALANCER

FIELD OF INVENTION

This invention relates to pendent-type wheel balancers for autos and light trucks, and more particularly to an improved portable wheel balancer for do-it-yourself mechanics.

BACKGROUND—DESCRIPTION OF PRIOR ART

Present static wheel balancers, as in patents 4,448,073, 4,237,735, 4,051,733, 4,043,218, 4,011,762, 3,992,950, 3,148,546, and 3,045,479 use a horizontal mounting plate or spider to support the mounting plate of the central hub of the wheel being balanced so that the wheel-tire assembly rests in a horizontal position when balanced. The deviation from horizontal when the wheel is allowed to hand in a free, pendulant position indicates the degree of imbalance of the wheel-tire assembly. With the above-mentioned balancers, if the mounting plate of the wheel is slightly misaligned with the rest of the wheel due to bending from striking a curb or a road hazard, or due to mismanufacture, the resulting indication of balance condition will be incorrect. Patent No. 3,452,605 does not use a horizontal plate or spider, but instead uses three positioning members for "horizontally orienting the wheel thereon". The balancer of Patent No. 3,036,468 would not be effected by the misalignment of the wheel mounting plate, but only provides for balance measurement around one horizontal axis at a time.

OBJECTS OF THE INVENTION

An object of this invention is to provide a balancer which will provide a true balance indication even if the mounting plate of the wheel being tested is misaligned with the rest of the wheel due to bending resulting from striking a curb or road hazard or from other causes. An additional object of this invention is to provide a static balancer of simple design which can be manufactured cheaply for the do-it-yourself home mechanic, and which will still provide an accurate result. an additional object of this invention is to provide indication of balance condition around all horizontal axes through the balance pivot point in one test. Further objects and advantages of my invention will become apparent from consideration of the following drawings and description.

CONTENT OF DRAWINGS

Figure 1:
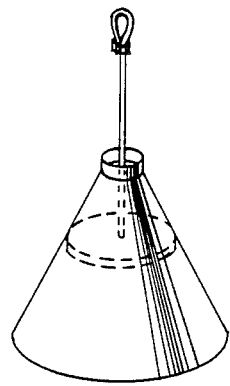
FIG. 1 is a perspective view of the wheel balancing apparatus embodying my invention.

LIST OF REFERENCE NUMERALS AND RESPECTIVE PARTS IN FIGURES 4 wheel
5 wheel & tire assembly
6 tire
8 body of balancer
9 balancer assembly
10 tubular extension of cone
12 cable suspension
14 disk
16 center hole in disk
18 open end of tube
20 loop for hanging
22 appropriate lifting means
24 swaged fitting at disk
26 swaged fitting at loop
28 threaded disk
30 wheel center of gravity
32 hollow threaded shaft
34 threaded nut
36 cap nut
38 center hole pivot point in cap nut
40 point of suspension

DETAILED DESCRIPTION OF THE PREFERRED EMBODIMENT

Figure 2:
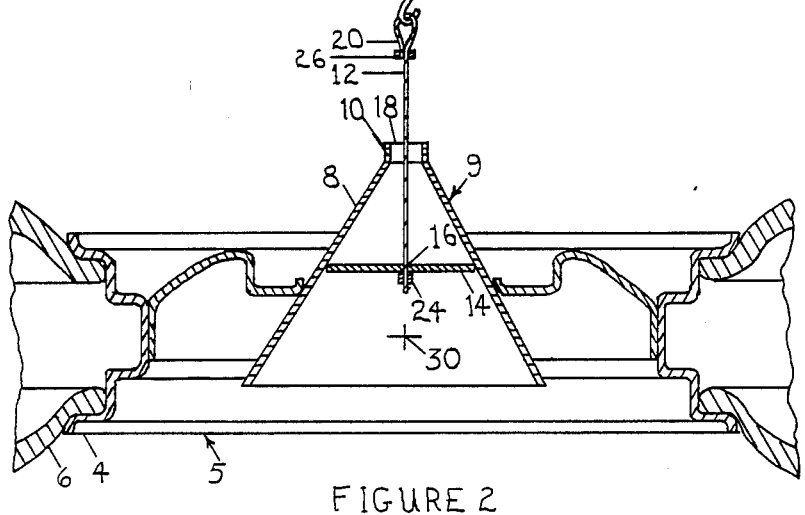
FIG. 2 is a cross sectional view of the balancer with an automotive wheel and tire mounted in operative relationship to the balancer.

The accompanying drawings show the preferred embodiment of the wheel balancer which is constructed in accordance with the principles of my invention. In FIG. 2 the balancer is being used with a wheel 4 and tire 6 assembly 5. The balancer 9 is in operable position in the central mounting aaperture of the wheel 4. The wheel-tire assembly 5 is oriented in a horizontal position. The body of the balancer 8 is a truncated cone which is open at the small upper end. The drawings show a short open tubular extension 10 on the small end of the cone which is not necessary to function, but which is preferred construction since it strengthens the small end of the cone against deformity from bumping by the elongated cable 12 when in use. Disk 14 is affixed in the body 8 so its axis through its center is coincident with that of the cone body 8. A thin, elongated flexible cable 12 extends through a circular hole 16 in the exact center of the disk 14, up through the open end of the balancer tube 18 and terminates in a loop or hook 20 so it may be conveniently attached to an appropriate lifting means such as the simple pulley arrangement 22 shown in FIG. 2. Swaged fitting 24 is used on the disk end of the cable 12 to take the load of the tire-wheel-balancer assembly, and swaged fitting 26 is used to fix the loop for suspension purposes. The diameter of the disk 14 determines its position along the vertical center axis of the balancer body 8, and is such that the center hole 16 of the disk 14, which is the universal pivot point for the balancer, is above the center of gravity 30 of any wheel to be balanced.

Figure 3:
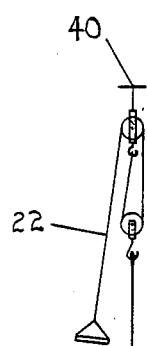
FIG. 3 is a cross sectional view of a ramification of the balancer incorporating a sensitivity adjustment.
Figure 3:
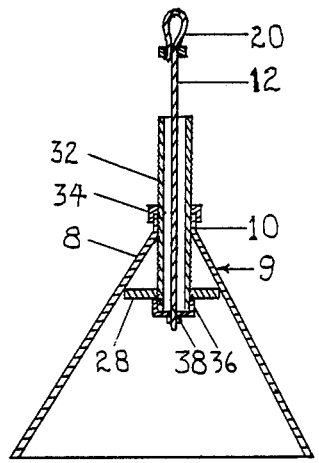

FIG. 3 shows a ramification of the embodiment of my invention. This ramification incorporates a means for controlling sensitivity of the instrument by adjusting the height of the pivot point 38 in relation to the center of gravity of the wheel. This adjustment also makes it possible to balance wheels which have larger or smaller hub openings or higher or lower centers of gravity than is the usual case. The major parts, i.e. the body 8, the threaded disk 28, and the elongated cable 12 are the same in this ramification except the disk 28 is drilled and tapped through its center with threads to match the externally threaded hollow shaft 32. The shaft 32 is threaded up through the disk 28, then up through the short tubular end of the body 10 and is held in place with a centering nut 34. A cap nut 36 on the lower end of the threaded shaaft 32 has a hole 38 in its center through which passes the suspension cable 12. The cable is affixed as in the standard balancer with swaged fittings.

OPERATION OF THE PREFERRED EMBODIMENT

The wheel-tire assembly 5 is laid on a horizontal table or surface and roughly centered under the point of suspension 40 of an appropriate lifting means 22. The balancer 9 and cable 12 are led up through the wheel aperture and attached to the lifting means 22. Enough pressure is applied to pull the conically-shaped balancer 9 up and center it in the wheel hub aperture. Additional pressure is applied lifting the entire assembly allowing it to swing freely and center itself exactly under the point of suspension 40. The wheel assembly is then lowered to the horizontal surface, but enough lifting pressure is maintained so the balancer 9 retains its position in the wheel hub. Next, the balance 9 is manually adjusted within the wheel hub so that the cable 12 is exactly centered in the open end of the tube 18. The wheel assembly 5 is again lifted, and any imbalance causes tipping from the horizontal position, and is indicated by the new position of the cable 12 within the opening 18. Balancing of the wheel is accomplished by placing, the later attaching, appropriate weights along the rim of the wheel 4. Operation of the balancer with the sensitivity control in FIG. 3 is the same as described above except the continuously threaded shaft 32 may be rotated through the threads on the disk 28 and nut 34 to raise or lower the pivot point 38 with respect to the center of gravity 30 of the wheel being balanced.

Thus the balancer of this invention provides a device which could be economically manufactured for use of the home mechanic, and which makes accurate wheel balancing possible even when the mounting plate of the wheel hub is not in alignment with the rest of the wheel.

While the invention has been particularly described and shown in reference to the preferred embodiment thereof, it will be understood to those skilled in the art that various changes in form and detail and omissions may be made therein without departing from the spirit and scope of the invention. For example, the parts of the embodiment could be constructed of various materials such as aluminum, steel, or plastic. The suspension cable 12 could be made of nylon cord and affixed with knots. The threaded hollow shaft 32 could be a smooth, hollow, slideable shaft, being locked into position with a thumb screw.

What is claimed:

1. An apparatus for balancing wheels regardless of whether or not the mounting plate of the wheel is aligned with said wheel comprising:

a means for simultaneously centering and supporting said wheel in a generally horizontal position through a center hole of said wheel consisting of an upwardly tapering truncated conically-shaped body element, said element being open at the upper end;

a vertically elongated flexible suspension cable adapted to an appropriate lifting means;

a means of attachment of said cable centrally to said cone body said attaching means consisting of a disc affixed inside said cone body with the axis through the center of said disc coincident with the axis through the center of said cone body and the vertical position of said disc being above the center of gravity of said wheel when said balancing apparatus is operably engaged with said wheel;

a means for adjustment of the sensitivity of said balancing apparatus and for attachment of said cable to said disc consisting of a vertically adjustable hollow shaft, said hollow shaft being open at the upper end and having a cap on the lower end with a center hole in said cap;

said hollow shaft passing through the center of said disc and the center of said upper aperture of said cone body, said suspension cable being secured through said center hole in said cap, passing upwardly through said hollow shaft, through said open upper end of said hollow shaft for attachment to said lifting means, said shaft cap center hole being the universal pivot point about all horizontal axes whereby any imbalance condition results in tipping of said wheel, said imbalance condition being observable as lack of centrality of said cable within said open end of said shaft.

* * * * *